United States Patent
Komma et al.

Patent Number: 6,078,551
Date of Patent: Jun. 20, 2000

[54] OPTICAL INFORMATION RECORDING OR ERASING SYSTEM

[75] Inventors: Yoshiaki Komma, Hirakata; Shinichi Tanaka, Kyotanabe; Mitsurou Moriya, Ikoma, all of Japan

[73] Assignee: Matsushita Electric Industrial Co., Ltd., Osaka, Japan

[21] Appl. No.: 09/348,676

[22] Filed: Jul. 6, 1999

Related U.S. Application Data

[63] Continuation of application No. 08/905,866, Aug. 4, 1997, abandoned, which is a continuation of application No. 08/657,501, Jun. 4, 1996, abandoned, which is a continuation of application No. 08/224,516, Apr. 7, 1994, abandoned.

[30] Foreign Application Priority Data

Apr. 16, 1993 [JP] Japan .................................. 5-89612

[51] Int. Cl.⁷ .................................................. G11B 7/095
[52] U.S. Cl. ............................ 369/44.29; 369/47; 369/54
[58] Field of Search ............................ 369/44.27, 44.29, 369/44.31, 44.32, 44.33, 44.35, 54, 116, 47–48

[56] References Cited

U.S. PATENT DOCUMENTS

| | | | |
|---|---|---|---|
| 4,807,210 | 2/1989 | Kaku et al. | 369/44.13 |
| 4,819,220 | 4/1989 | Miyazaki et al. | 369/44.24 |
| 5,297,114 | 3/1994 | Itoh et al. | 369/44.32 |

FOREIGN PATENT DOCUMENTS

3-141039  6/1991  Japan .

*Primary Examiner*—W. R. Young
*Attorney, Agent, or Firm*—Louis Woo

[57] ABSTRACT

An optical information recording and/or erasing system is provided. This system includes a servo control circuit for feedback-controlling an optical system to compensate for focusing and tracking errors during record and reproduce modes of operation. For compensating for misalignment of an optical spot formed by the optical system falls on a recording medium, the offset is applied to a servo control signal. During a preselected period of time following application of the offset required for completing the servo control, information-recording or erasing operation is inhibited. Thus, fine recording conditions are faithfully established from a leading edge of a recording portion of the recording medium.

22 Claims, 7 Drawing Sheets

OPTICAL INFORMATION RECORDING OR ERASING SYSTEM

This application is a continuation of application Ser. No. 08/905,866, filed on Aug. 4, 1997 which is a continuation application of continuation application Ser. No. 08/657,501, filed on Jun. 4, 1996 which is a continuation application of application Ser. No. 08/224,516, filed on Apr. 7, 1994, all of which are now abandoned.

BACKGROUND OF THE INVENTION

1. Technical Field of the Invention

The present invention relates generally to an optical information recording and/or erasing system, and more particularly to an optical information recording and/or erasing system with a servo control circuit for adjustment of focusing and tracking errors of an optical system relative to an information recording medium such as an optical disk.

2. Background Art

The present invention represents an improvement on an optical information recording/reproducing system, as taught in Japanese Patent First Publication No. 3-141039. This prior art system has a servo control circuit for feedback-controlling an optical system to compensate for a focusing error during record and reproduce modes of operation. When a semiconductor laser is employed as a light source for recording and reproducing information data on and from an optical disk, a change in power of the light source between the record and reproduce modes of operation will cause the wavelength of light from the light source to be changed, leading to variation in refractive index of an objective lens of the optical system. This results in an optical spot formed by the objective lens of the optical system on the optical disk remaining defocused until a focus tracking operation has been completed. For avoiding this drawback, the prior art system provides the offset to a servo control signal to compensate for the misalignment of the optical spot due to the variation in wavelength of the light from the light source.

The above prior art system, however, experiences the following focusing difficulties during the recording. The objective lens takes about 100 $\mu$s to 1 ms to reach a record focusing position where the optical spot is exactly focused on the optical disk after the offset is applied to the servo control signal. Therefore, when a desired address recorded on the optical disk is detected immediately after the application of the offset (e.g. after 10 $\mu$s), an information data-recording operation is undesirably initiated before the objective lens has reached the record focusing position completely, thereby causing a leading portion of the information data to fail to be recorded.

SUMMARY OF THE INVENTION

It is therefore a principal object of the present invention to avoid the disadvantages of the prior art.

It is another object of the present invention to provide an optical information data recording/erasing system which is designed to perform information recording or erasing operation after focusing or tracking operation of an optical system has been completed following detection of a desired address recorded on an information-recording medium for establishing fine recording conditions from a leading portion of information data.

According to one aspect of the present invention, there is provided an optical information recording and/or erasing system which comprises a light source, an optical system including a lens which is arranged to converge light beams emerging from the light source to form an optical spot on an information-recording medium, a photodetector responsive to light reflected from the information-recording medium to provide a tracking error signal representative of a tracking error caused by a difference between a focal point of the lens of the optical system and a center line of a recording-track defined on a recording surface of the information-recording medium, a servo control means, responsive to a tracking control signal, for moving the lens of the optical system to compensate for the tracking error, an offset signal circuit applying an offset signal having a preselected level to the tracking control signal, and a control circuit responsive to the tracking error signal output from the photodetector to provide the tracking control signal to the servo control means, the control circuit initiating an information-recording or erasing operation after the application of the offset signal to the tracking control signal by the offset signal circuit and inhibiting the application of the offset signal to the tracking control signal during the information-recording or erasing operation.

According to another aspect of the present invention, there is provided an optical information recording and/or erasing system which comprises a light source, an optical system including a lens which is arranged to converge light beams emerging from the light source to form an optical spot on an information-recording medium, a photodetector responsive to light reflected from the information-recording medium to provide a servo error signal indicative of misalignment of a focal point of the lens of the optical system on the information-recording medium, a servo control means, responsive to a servo control signal, for moving the lens of the optical system to compensate for the misalignment of the focal point of the lens, an offset signal circuit applying an offset signal having a preselected level to the servo control signal, and a control circuit responsive to the servo error signal from the photodetector to provide the servo control signal to the servo control means, the control circuit inhibiting an information-recording or erasing operation for a preselected period of time following application of the offset signal to the servo control signal.

According to a further aspect of the present invention, there is provided an optical information recording and/or erasing system which comprises a light source, an optical system including a lens which is arranged to converge light beams emerging from the light source to form an optical spot on an information-recording medium, a photodetector responsive to light reflected from a servo error-detecting portion defined on the information-recording medium to provide a servo error signal indicative of misalignment of a focal point of the lens of the optical system on the information-recording medium, a servo control means, responsive to a servo control signal, for moving the lens of the optical system to compensate for the misalignment of the focal point of the lens, an offset signal circuit adding an offset signal to compensate for a variation in the servo control signal due to a variation in wavelength of the light beams provided from the light source, and a control circuit responsive to the servo error signal from the photodetector to provide the servo control signal to the servo control means, the control circuit inhibiting an information-recording or erasing operation for a preselected period of time following addition of the offset signal to the servo control signal.

According to a still further aspect of the invention, there is provided an optical information recording and/or erasing system which comprises a light source, an optical system including a lens which is arranged to converge light beams emerging from the light source to form an optical spot on an information-recording medium, the information-recording medium including an information-recording portion on which information data are recorded and an address portion on which addresses are recorded, the information-recording portion having a recording density of 3 bits per square $\mu$m, the recording density of the address portion being lower than that of the information-recording portion, a photodetector responsive to light reflected from the information-recording medium to provide a servo error signal indicative of misalignment of a focal point of the lens of the optical system on the information-recording medium, a servo control means, responsive to a servo control signal, for moving the lens of the optical system to compensate for the misalignment of the focal point of the lens, an offset signal circuit adding an offset signal to compensate for a variation in the servo control signal due to a variation in wavelength of the light beams provided from the light source, and a control circuit responsive to the servo error signal from the photodetector to provide the servo control signal to the servo control means, the control circuit inhibiting an information-recording or erasing operation for a preselected period of time following addition of the offset signal to the servo control signal.

According to a further aspect of the invention, there is provided an optical information system designed to perform an information-reproducing operation and at least one of information-recording and -erasing operations. The system comprises: (a) a light source; (b) an optical system including a lens which is arranged to converge light beams emerging from the light source to form an optical spot on an information storage medium; (c) a photodetector responsive to light reflected from the information storage medium to provide a servo error signal indicative of misalignment of a focal point of the lens of the optical system on the information storage medium; (d) a servo control means, responsive to a servo control signal, for moving the lens of the optical system to compensate for the misalignment of the focal point of the lens; (e) an offset signal circuit applying an offset signal having a preselected level to the servo control signal; and (f) a control circuit responsive to the servo error signal from the photodetector to provide the servo control signal to the servo control means, when it is required to perform one of the information-recording and -erasing operations, the control circuit providing control the servo control means so as to move the focal point of the lens to a location on the information storage medium different from that during the information-reproducing operation and to maintain the information-reproducing operation for a preselected period of time, after the preselected period of time, the control circuit starting the one of the information-recording and -erasing operations and prohibiting the offset signal circuit from applying the offset signal to the servo control signal.

In the preferred mode of the invention, after the preselected period of time, the control circuit performs an address readout operation to read a desired address and then starts the one of the information-recording and -erasing operations and prohibits the offset signal circuit from applying the offset signal to the servo control signal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
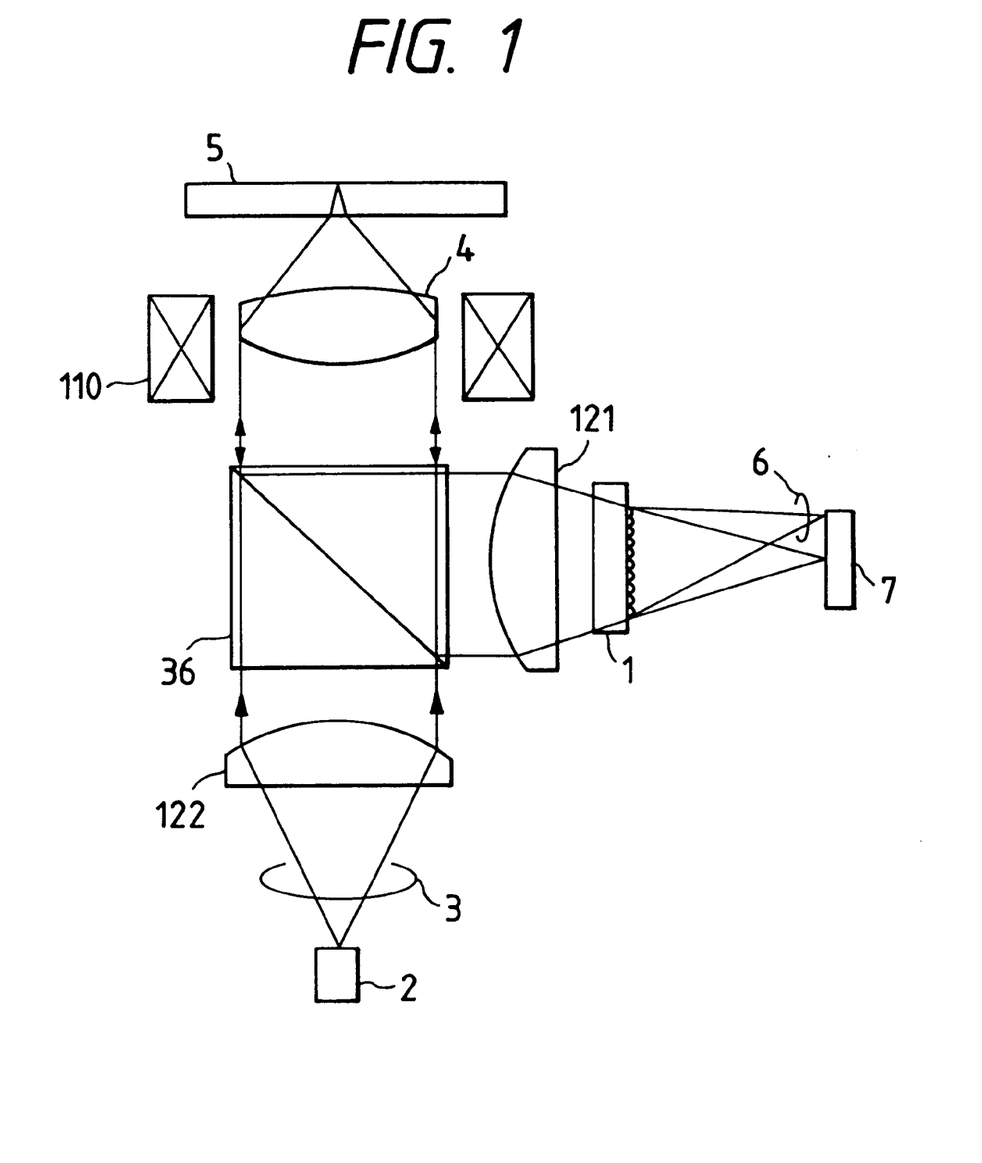
FIG. 1 is a schematic illustration which shows an optical head unit employed in an information recording/erasing system according to the present invention.

Referring now to the drawings, wherein like numbers refer to like parts in several views, particularly to FIG. 1, there is shown an optical head unit of an optical information recording, reproducing and erasing system according to the present invention.

The optical head unit includes generally a light source 2 such as a semiconductor laser, collimating lenses 121 and 122, a beam splitter 36, an objective 4, a lens actuator 110, a holographic optical element 1, and a photodetector 7.

Light beams (laser beams) 3 emerging from the light source 2 are oriented by the collimating lens 122 into parallel beams which in turn, enter the objective lens 4 through the beam splitter 36 so that they are converged to form an optical micro spot on an information-recording medium 5 such as an optical disk. The light beams converged on the information medium 5 are then reflected thereon back toward the beam splitter 36 through the objective lens along the same optical path to be directed to the collimating lens 121. The collimating lens 121 then converges the light beams from the beam splitter 36 onto the photodetector 7 through the holographic optical element 1. The photodetector 7 is responsive to the incident light beams 6 to output electric signals according to the quantity of light which, in turn, are analyzed to provide a servo error signal (i.e., focusing and tracking error signals) and an information signal indicative of such as addresses and information data recorded.

The holographic optical element 1 is designed to modulate the wavefront of the light beams reflected from the information-recording medium 5 to direct same onto the photodetector 7 for stability of the focusing and tracking error signals. However, it may alternatively be placed with a cylindrical lens or parallel plates using the astigmatism.

Figure 2:
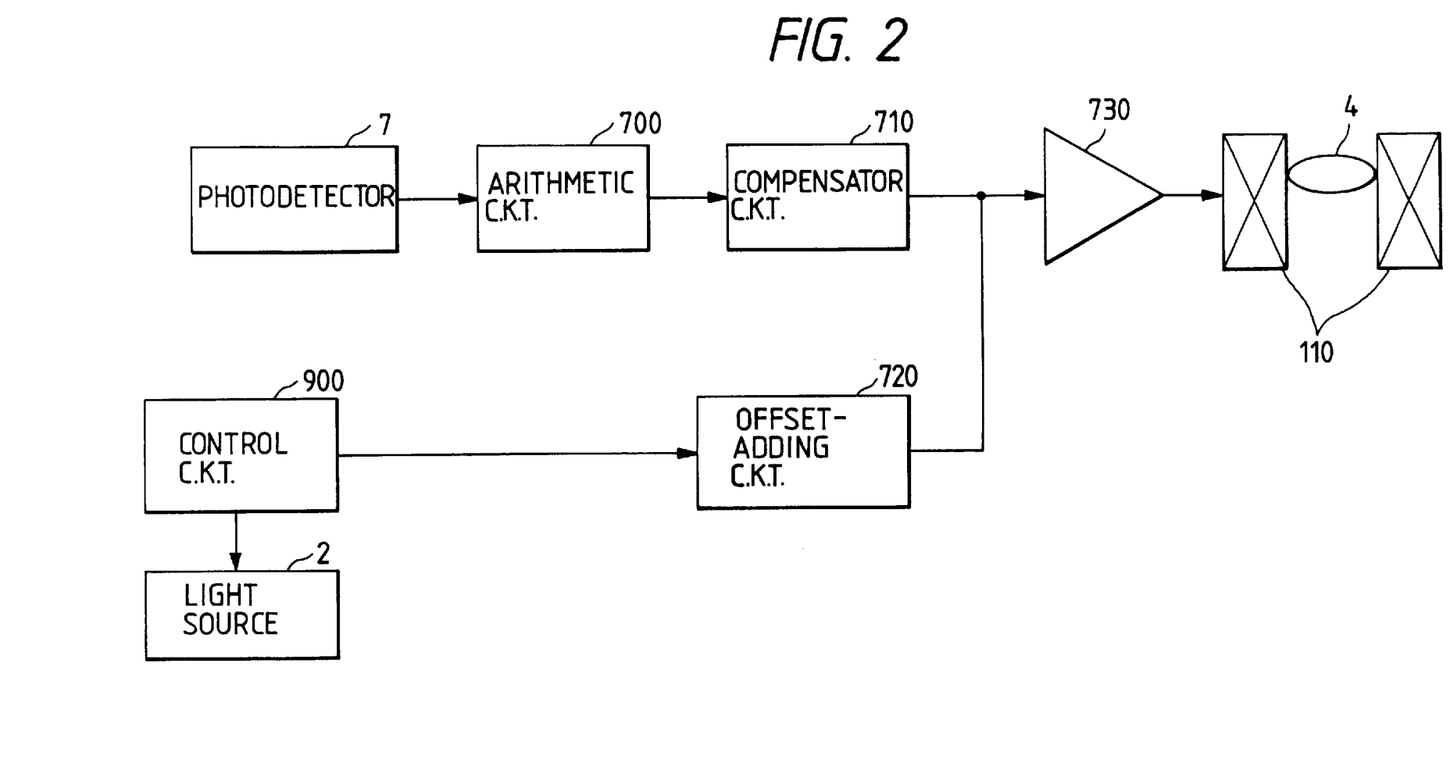
FIG. 2 is a block diagram which shows a servo control circuit for compensating for focusing and tracking errors of an optical system of an information recording/erasing system of the present invention.

FIG. 2 shows a focus servo circuit of the optical information recording, reproducing, and erasing system of the invention. The focus servo circuit includes an arithmetic circuit 700, a compensator circuit 710, an offset-adding circuit 720, an amplifier 730, and a control circuit 900.

The arithmetic circuit 700 process an output signal from the photodetector 7 to provide a focusing error (FE) signal (i.e., a servo error signal). The compensator circuit 710 is responsive to the FE signal to control a focusing gain to a constant value under the AGC and to compensate for the phase of the FE signal, and provides the modified FE signal (i.e., a servo control signal). The offset-adding circuit 720 provides an offset signal to the FE signal output from the compensator circuit 710 for compensating for misalignment of a focal point (i.e., a difference between the focal point of the objective lens 4 and a recording-surface of the information-recording medium 5) caused by a change in wavelength of the light beams from the light source 2. The amplifier 730 applies an energization current to the lens actuator 110 to move the objective lens 4 so as to adjust the FE signal to zero for bringing the objective lens 4 into focus on the information-recording medium 5.

Figure 3:
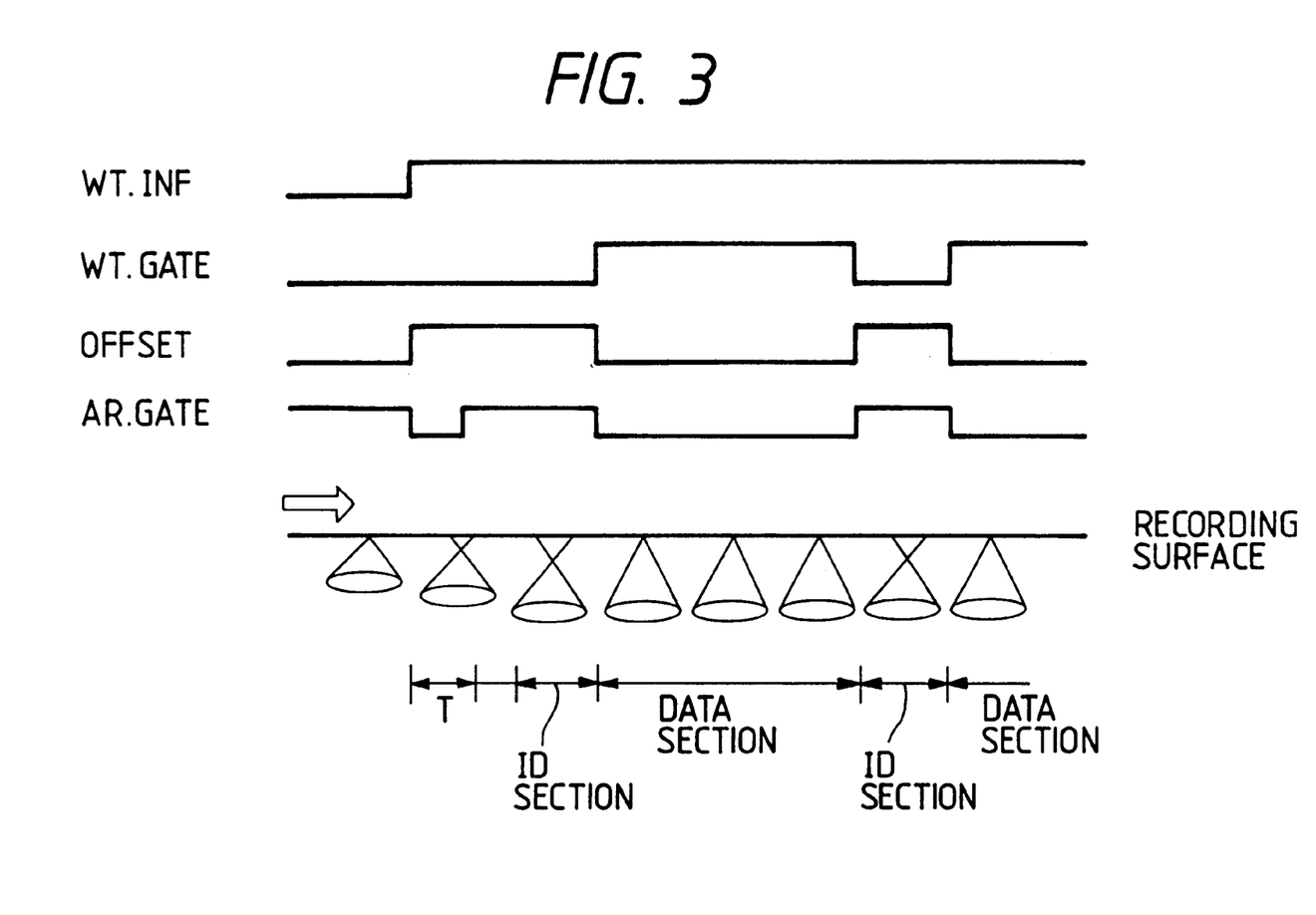
FIGS. 3 to 6 are time-charts each showing the relation between signal-outputting timing of a focus servo circuit and operational timing of an optical system.

FIG. 3 shows the relation between signal-outputting timing of the focus servo circuit and operational timing of the objective lens 4.

In a reproduce mode of operation, the photodetector 7 detects the light beam from the collimating lens 121 to provide a focal point indicative signal which is, in turn, inputted through the arithmetic circuit 700 and the compensator circuit 710 to the amplifier 730. The lens actuator 110 then moves the objective lens 4 so as to adjust the FE signal to zero, thereby bringing the objective lens into focus on the information-recording medium 5.

In a record mode of operation, when a writing information (WT.INF) signal for storage of information data is provided by the control circuit 900, it will enable the offset-adding circuit 720 to add the offset signal to the amplifier 730 for displacing the objective lens 4 to a record focusing position where an optical spot formed by the objective lens 4 is exactly focused onto the information-recording medium 5. At the same time, the control circuit 900 provides a stand-by signal to turn an address-reading gate (AR. GATE) signal off to inhibit address-reading operation for a stand-by time period T. After the stand-by time period has expired, the address-reading gate signal is turned on to begin searching for an address recorded on an address portion (represented as ID section in the drawings) of the information-recording medium 5. When a desired address is detected, a writing gate (WT. GATE) signal is provided or turned on to disable the offset-adding circuit 720 to stop adding the offset signal to the FE signal and to initiate data-recording operation so that information data are recorded on a data-recording portion (referred to as data section in the drawings) defined on the information recording medium 5. Alternatively, the address-reading operation may be performed during the stand-by time period T as long as the address-reading gate signal is not provided to maintain the data-recording operation inhibited even though the desired address is detected. It is advisable to begin recording the information data on the data recording portion in response to the writing gate signal following detection of the desired address after the information-recording medium 5 makes its complete turn (single rotation) and the writing gate signal is provided to stop adding the offset signal to the FE signal.

As discussed above, in the above arrangements, after the movement of the objective lens 4 has been completed within the stand-by time period T, the offset-adding circuit 720 is disabled to stop outputting the offset signal and then the data-recording operation is initiated. Thus, fine recording condition are faithfully established from a leading edge of the data-recording portion.

In addition, a data-erasing operation may be carried out in a similar manner to that explained above.

The stand-by time period T may be changed dependent upon a variation in ambient temperature, however, even when the stand-by time period T is set to a constant value, the fine recording conditions are achieved from the leading edge of the data-recording portion.

Usually, the movement of the objective lens 4 to the record focusing position takes about 100 $\mu$s to 1 ms. It is thus, preferable that the stand-by time period T be set to more than 100 $\mu$s (T>100 $\mu$s). However, when the stand-by time period T is too long, it will cause the access time when recording the information data to undesirably become long. Thus, the stand-by time period T is desirable to be as short as possible over 100 $\mu$s.

An optical disk can usually rotate at a speed of up to 3600 rpm. One complete turn of the optical disk thus, requires approximately 17 ms. This means that even if a desired address is located on the same track as that on which an optical spot falls from the objective lens 4, when the optical spot passes over the desired address immediately before the start of detection of the address, at least 17 ms is necessary to detect the desired address after one complete turn of the optical disk. Accordingly, when the stand-by time period T<1 ms, it may be considered to lie within an allowable range of an increase in access time. It will thus be appreciated that the stand-by time period T fall within a range from 100 $\mu$s to 1 ms.

An alternative embodiment designed to determine the stand-by time period T based on a variation in the FE signal will be discussed herinbelow within reference to FIG. 4.

Figure 4:
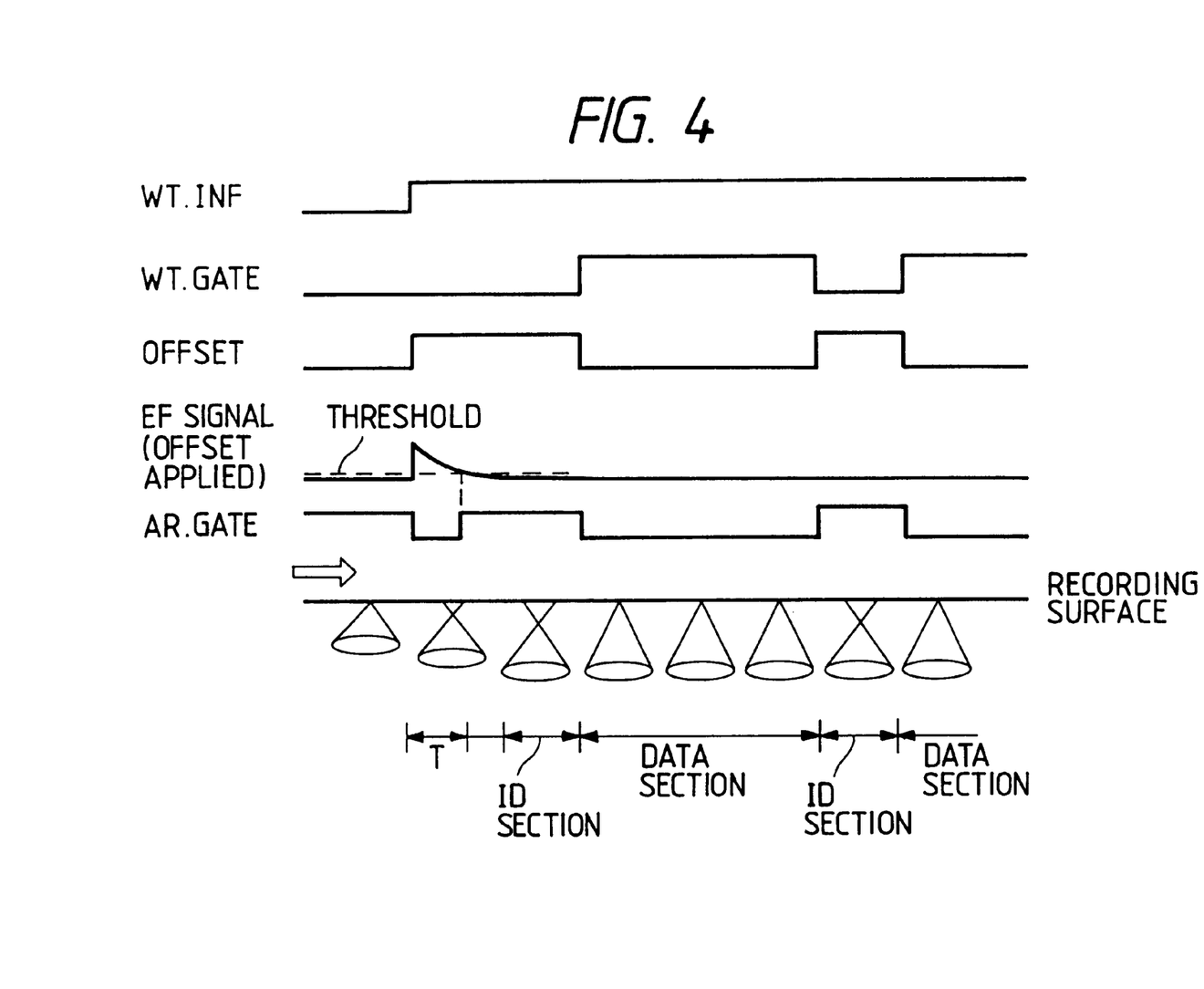

The focusing error FE signal, as shown the time-chart of FIG. 4, includes the offset signal applied.

In response to the writing information signal (WT. INF), the offset signal is added to the FE signal (focus control signal), and thereafter, the lens actuator 110 is activated to move the objective lens 4 in a direction of decreasing the FE signal to zero. However, since the time required for the optical spot of the objective lens 4 to pass over the address portion of the information recording medium 5 where the system re-enters the reproduce mode and the light source 2 reduces a lighting power (i.e., the quantity of light) of the optical spot during the record mode of operation, is only on the order of 10 $\mu$s, during this time period, the objective lens 4 may be considered to hardly move over the address portion.

As can be seen in the time-chart, this embodiment provides a threshold value for the FE signal. In operation, upon the writing information signal (WT. INF) being provided, the offset signal is added to the FE signal, and the address-reading gate signal is turned off. Subsequently, when the FE signal is decreased under the servo control of the objective lens 4 to the threshold value, the address-reading gate signal is turned on again to initiate the address-detecting operation. When the desired address is detected, the writing gate (WT. GATE) signal is provided to begin to record the information data on the data-recording portion of the information-recording medium 5 while inhibiting the offset signal from being added to the FE signal.

It will thus be appreciated that the determination of the stand-by time period T based on the variation in the FE signal makes it possible to initiate the data-recording operation after the objective lens 4 has completely reached the focusing position. In addition, the stand-by time period T is minimized, thereby shortening the access time.

When the power of the light source 2 is reduced while the objective lens 4 moves through the address portion during the recording, for maintaining the objective lens 4 at the record focusing position as it is, the writing gate (WT. GATE) signal is turned off while the offset signal is added to the FE signal again. After the address portion has been passed, the writing gate signal is turned on while the offset signal is off.

When the optical spot formed by the objective lens 4 passes through the address portion, a smaller amount of the offset to be applied to the FE signal than that before the recording operation may be provided by reducing the power of the light source down to only a level, for example, an erasing power level which is higher than a reproducing power level. It is because the erasing power level can lower a variation in wavelength of the optical spot as compared with the reproducing power level. This makes the focusing control stable further. In addition, during an erase mode of operation, the need for the offset signal to be applied to the FE signal while the objective lens 4 passes over the address portion may be eliminated by maintaining the power of the light source at the erasing power level as is. Alternatively, since the time for passage of the objective lens 4 over the address portion, as stated above, is only on the order of 10 µs, even if, during such a time interval, the offset is not applied to the FE signal, the objective lens 4 may be considered to substantially stay at the address portion. Therefore, it is desirable that when the objective lens 4 passes over the address portion between the data-recording portions, no offset be provided for the sake of simplicity of the servo control circuit. This results in reduced manufacturing costs and improved reliability.

Figure 5:
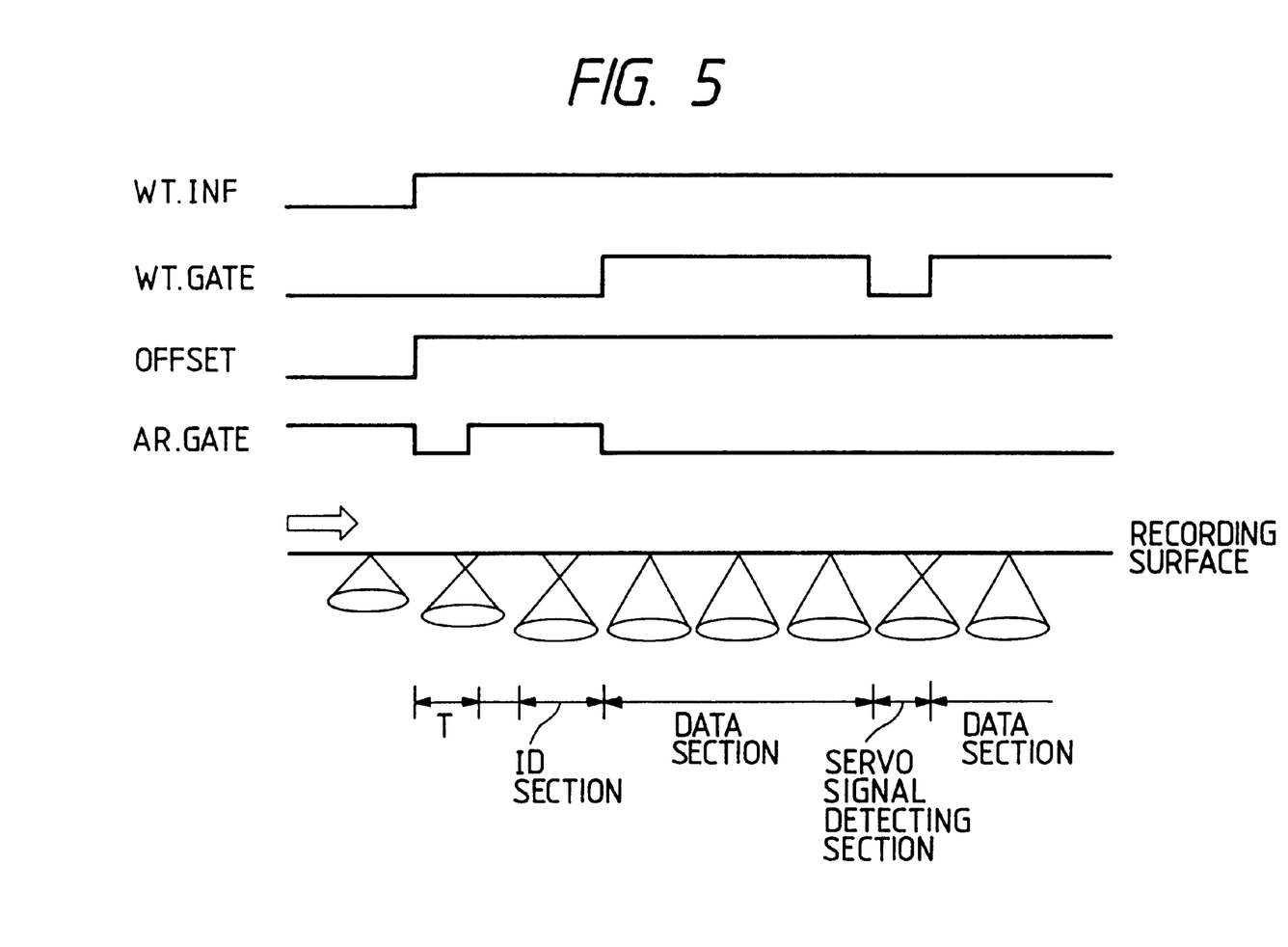
Figure 6:
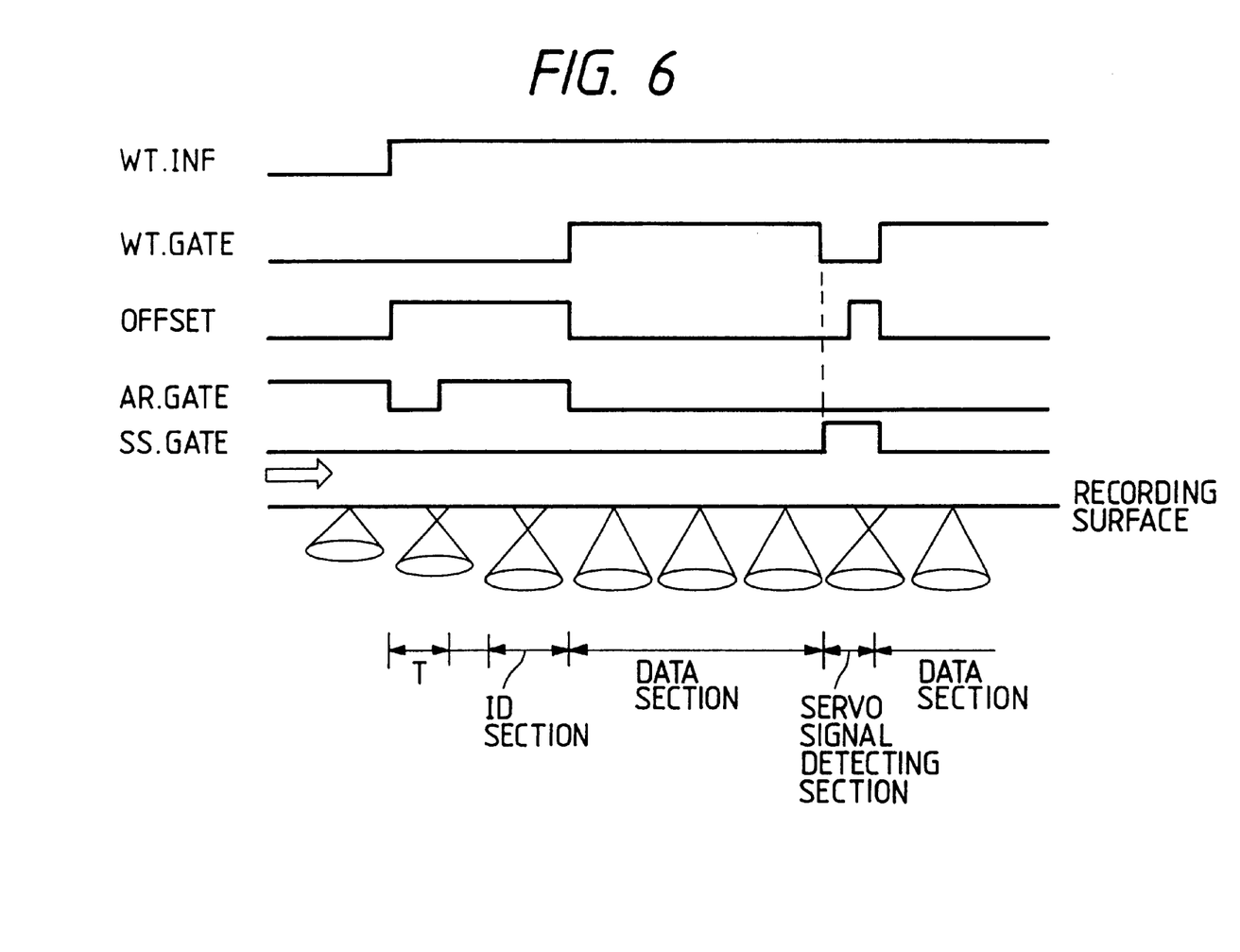

When using a sample-servo (ss) system for detection of a servo signal, the following arrangements are preferable. The sample-servo system, as referred to herein, represents a system wherein a servo signal-detecting portion which is smaller in area than the address portion, is provided on part of the information-recording medium 5 for provision of the FE signal and the tracking error (TE) signal. The time required for the objective lens 4 to pass over the servo signal-detecting portion is acknowledged to be only on the order of several µs which is shorter than that required to pass over the address portion. Thus, when light from the light source 2 is varied in wavelength after several µm following a change in power of the light source, the offset signal is not applied to the FE signal while the objective lens 4 passes over the servo signal-detecting portion. On the other hand, when a variation in wavelength immediately after the power of the light source is changed takes place within a short time period of 1 µs, the amount of offset enough to compensate for a variation in the FE signal caused by switching of the power of the light source, is applied to the FE signal. Since in the sample-servo system, the servo signal is detected only from the servo signal-detecting portion of the information recording medium 5, it is not necessary to turn the offset signal off on the data-recording portion. As long as the writing information (WT. INF) signal is, as shown in FIG. 5, turned on, the offset signal may remain applied to the FE signal.

Additionally, in the case where the variation in wavelength caused by change in the power of the light source, is created within a short period of time of 1 µs after the change in the power of the light source and the power of the light source 2 during a time when the objective lens 4 passes over the servo signal-detecting portion is decreased down to only a level, for example, the erasing power level higher than the reproducing power level, a smaller variation in wavelength will result, therefore, the amount of offset to be applied to the FE signal may be decreased as compared with that before the recording operation.

Moreover, in the case where in the erase mode of operation, the objective lens 4 moves over the servo signal-detecting portion maintaining the erasing power level, no offset is provided. Further, when the variation in wavelength immediately after the power of the light source is changed, is created while the objective lens 4 moves over the servo signal-detecting portion, the amount of offset enough to compensate for a variation in the FE signal caused by switching of the power of the light source is applied to the FE signal during a time when a sample-servo gate (ss. GATE) signal is turned on. Also, in this case, when the power of the light source 2 while the objective lens 4 passes over the servo signal-detecting portion is decreased down to only a level, for example, the erasing power level which is higher than the reproducing power level, the variation in wavelength will be small, therefore, the amount of offset to be applied to the FE signal may be decreased as compared with that before the recording operation. Additionally, when in the erasing mode of operation, the objective lens 4 moves over the servo signal-detecting portion maintaining the erasing power level as is, no offset is provided.

Additionally, at the start of the record mode of operation, the offset signal is, similar to the above, applied to the FE signal simultaneously with provision of the writing information (WT. INF) signal to move the objective lens to the record focusing position. However, on the address portion, the optical spot formed by the objective lens 4 may be shifted from the reproduce focal point to cause a malfunction of read out operation to occur due to variation in ambient temperature, vibrations, or deterioration with age of the system. In addition, with higher density recording, an allowable amount of misalignment of the focal point during the read out operation becomes smaller, causing the system to fail to read the information data. Usually, present-day optical disks such as a compact disk have a recording density of 1.2 bits per square µm, and the allowable amount of misalignment of the focal point during the read out operation is more than 1 µm. On the other hand, in optical disks having a recording density of more than 3 bits per square µm, the allowable amount of misalignment of the focal point during the read out operation becomes less than 1 µm and therefore, misalignment of the objective lens relative to a reproduce focusing position leads to a malfunction of read out operation.

Figure 7:
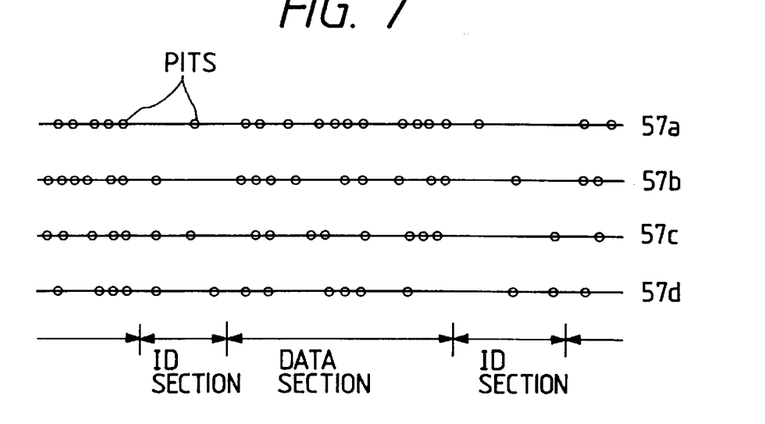
FIG. 7 is an illustration which shows recording density of a recording medium.

Accordingly, when using an optical disk having a recording density of more than 3 bits per square µm, the optical information recording and erasing system of the present invention, as shown in FIG. 7, records addresses on the address portion of the optical disk at a lower density than that of the data-recording portion. With this arrangement, an allowable range of misalignment of the focal point (i.e., a margin) may be increased, thereby preventing a malfunction of read out operation from occurring.

However, a difficulty may be encountered in that the misalignment of the focal point leads to the crosstalk, causing information interference from adjacent tracks. Thus, it is desirable that the recording density of the address portion be decreased to a lower value sufficient for avoiding a malfunction of the read out operation even if the crosstalk takes place.

Figure 8:
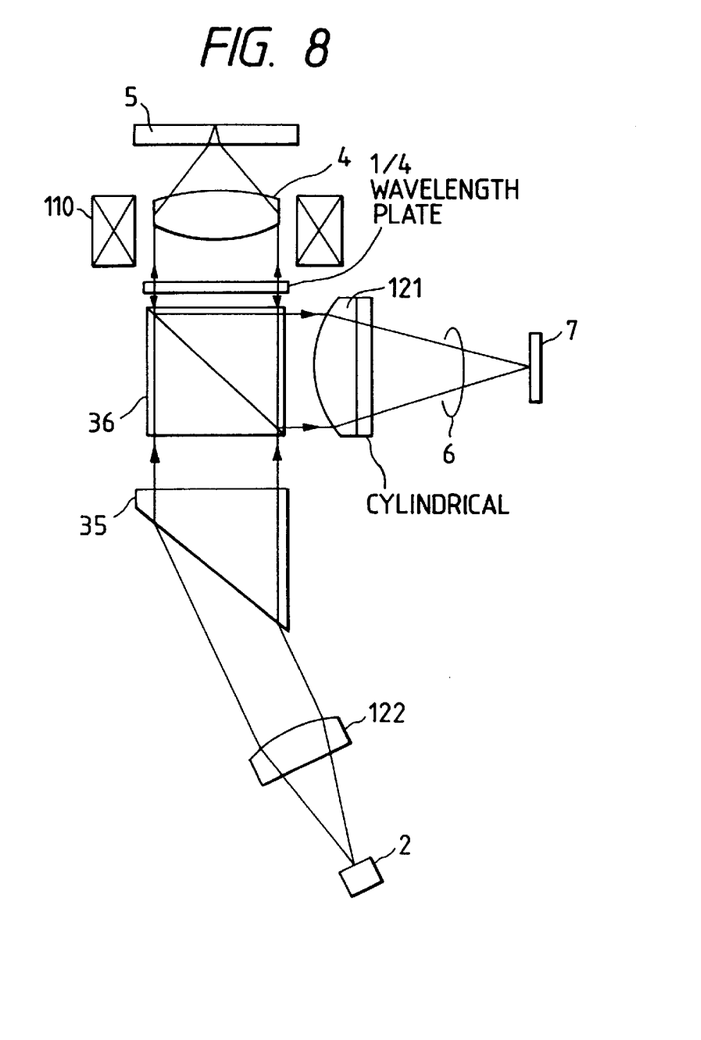
FIG. 8 is a schematic illustration which shows an alternative embodiment of an optical head unit employed in an information recording/erasing system according to the present invention.

In the above discussion, the focusing error signal and the focus servo system are referred to in the case where the misalignment of the focal point of the objective lens 4 is caused by the variation in wavelength of light from the light source 2. It should be noted however, that the present invention is not limited to same and that the benefits of the invention may also be applied to a tracking servo system. For example, an optical head unit, as shown in FIG. 8, may be utilized in the information recording, reproducing, and erasing system of the invention. The optical head unit, as shown, includes a prism 35 functioning as a beam-shaping means for improving the convergence and the utilization factor of light beams, however, it also raises a drawback in that a focused spot on a recording surface of the information-recording medium 5 may be shifted in position due to a variation in wavelength of light. However, the system of the invention is capable of arranging the focused spot on pit lines (imaginary center line 57a to 57d of tracks, as shown in FIG. 7) under the above mentioned servo control using a tracking error signal indicative of the difference between a focal point of the objective lens 4 and the center line of the track. In practice, a tracking offset signal is applied to a tracking error signal of a tracking servo circuit. After the stand-by time period T has expired, the tracking offset signal is turned off and then the recording or erasing operation is initiated. In this manner, even when the variation in wavelength of light occurs, the recording or erasing operation may be performed without the tracking error.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical information recording and/or erasing system comprising:
   a light source;
   an optical system including a lens which is arranged to converge light beams emerging from said light source to form an optical spot on an information-recording medium;
   a photodetector responsive to light reflected from the information-recording medium to provide a servo error signal indicative of misalignment of a focal point of the lens of said optical system on the information-recording medium;
   servo control means, responsive to a servo control signal, for moving the lens of said optical system to compensate for the misalignment of the focal point of the lens;
   an offset signal circuit applying an offset signal having a preselected level to the servo control signal; and
   a control circuit responsive to the servo error signal from said photodetector to provide the servo control signal to said servo control means, said control circuit inhibiting an information-recording or erasing operation for a period of time following application of the offset signal to the servo control signal, said information-recording or erasing operation going forward after the expiration of the period of time and detection by said control circuit of a desired address on said information-recording medium for said operation.

2. An optical information recording and/or erasing system as set forth in claim 1, wherein the period of time during which the information-recording or erasing operation is inhibited is set to a time interval required for the lens of said optical system to move to a desired focusing position on the information-recording medium.

3. An optical information recording and/or erasing system as set forth in claim 2, wherein the period of time ranges from 100 µs to 1 ms.

4. An optical information recording and/or erasing system as set forth in claim 1, wherein the period of time is determined based on a variation in the servo control signal.

5. An optical information recording and/or erasing system as set forth in claim 4, wherein at least one of the information-recording and erasing operation is inhibited for a period of time that expires when the servo control signal is decreased below a preselected threshold value after the offset signal is added to the servo control signal.

6. An optical information recording and/or erasing system as set forth in claim 1, wherein the information-recording and erasing operations are performed to record and erase information data on and form an information-recording portion defined on the information-recording medium after the desired address recorded on an address portion of the information-recording medium is detected, when the desired address is detected within the period of time, said control circuit inhibiting the information-recording or erasing operation until the desired address is detected again.

7. An optical information recording and/or erasing system as set forth in claim 6, the information-recording medium includes a rotatable optical disk, when the desired address is detected within the period of time, said control circuit inhibiting the information-recording or erasing operation until one complete rotation of the optical disk.

8. An optical information recording and/or erasing system as set forth in claim 1, wherein the offset provided by the offset signal added to the servo control signal is determined to compensate for a change in the servo error signal caused by a variation in wavelength of the light beams from said light source.

9. An optical information recording and/or erasing system as set forth in claim 1, wherein the information-recording and erasing operations are performed to record and erase information data on and from an information-recording portion defined on the information-recording medium on which an address portion is provided, said control circuit disabling said offset signal circuit to stop adding the offset signal when the optical spot of the lens of said optical system passes over the address portion during the information-recording or erasing operation.

10. An optical information recording and/or erasing system as set forth in claim 1, wherein said control circuit deactivates the offset signal circuit to inhibit the offset signal from being applied to the servo control signal while the information-recording or erasing operation is performed to record and erase information data on and from an information-recording portion defined on the information-recording medium.

11. An optical information recording and/or erasing system as set forth in claim 1, wherein the information-recording and erasing operation are performed to record and erase information data on and from an information-recording portion defined on the information-recording medium on which an address portion is provided, when the optical spot formed by the lens of said optical system passes over the address portion during information-recording or erasing operation, the power of said light source being controlled to within a range from preselected first to second levels, the first level being greater than the power during an information-reproducing operation, the second level being smaller than the power during the information-erasing operation.

12. An optical information recording and/or erasing system as set forth in claim 1, wherein the servo error signal represents a focusing error caused by a difference between a focal point of the lens of said optical system and a recording surface of the information-recording medium, said servo control means moving the lens of said optical system to compensate for the focusing error.

13. An optical information recording and/or erasing system as set forth in claim 1, wherein the servo error signal represents a tracking error caused by a difference between a focal point of the lens of said optical system and a center line of a recording-track defined on a recording surface of the information-recording medium, said servo control means moving the lens of said optical system to compensate for the tracking error.

14. An optical information recording and/or erasing system as set forth in claim 1, further comprising a holographic optical element which modulates the wavefront of the light beams reflected from the information-recording medium to direct it toward said photodetector.

15. An optical information recording and/or erasing system as set forth in claim 1, wherein the information-recording and erasing operations are performed to record and erase information data on and from an information-recording portion defined on the information-recording medium on which an address portion is provided, the information-recording portion having a recording density of 3 bits per square $\mu$m, the recording density of the address portion being lower than that of the information-recording portion.

16. An optical information recording and/or erasing system comprising:
   a light source;
   an optical system including an lens which is arranged to converge light beams emerging from said light source to form an optical spot on an information-recording medium;
   a photodetector responsive to light reflected form a servo error detecting portion defined on the information-recording medium to provide a servo error signal indicative of misalignment of a focal point of the lens of said optical system on the information recording medium;
   servo control means, responsive to a servo control signal, for moving the lens of said optical system to compensate for the misalignment of the focal point of the lens;
   an offset signal circuit adding an offset signal to compensate for a variation in the servo control signal due to a variation in wavelength of the light beams provided from said light source; and
   a control circuit responsive to the servo error signal from said photodetector to provide the servo control signal to said servo control means, said control circuit inhibiting an information recording or erasing operation for a preselected period of time following addition of the offset signal to the servo control signal, said information-recording or erasing operation going forward after the expiration of the period of time and detection by said control circuit of a desired address on said information-recording medium for said operation.

17. An optical information recording and/or erasing system as set forth in claim 16, wherein the power of said light source is reduced to a preselected level while the optical spot of the lens of said optical system passes over the servo error-detecting portion on the information-recording medium, when a variation in wavelength of the light beams from said light source takes place over 1 $\mu$s following the reduction in the power of said light source, said control circuit disabling the offset signal circuit while the optical spot of the lens of said optical system passes over the servo error-detecting portion on the information-recording medium.

18. An optical information recording and/or erasing system as set forth in claim 16, wherein the power of said light source is reduced to a preselected level while the optical spot of the lens of said optical system passes over the servo error-detecting portion on the information-recording medium, when a variation in wavelength of the light beams from said light source take place within a duration of passage of the optical spot over the servo error-detecting portion following the reduction in the power of said light source, said control circuit activating the offset signal circuit to provide the offset signal to the servo control signal while the optical spot of the lens of said optical system passes over the servo error-detecting portion on the information-recording medium.

19. An optical information recording and/or erasing system as set forth in claim 16, wherein when the optical spot of the lens of said optical system passes over the servo error-detecting portion during information-recording or erasing operation, the power of said light source being controlled to within a range from preselected first to second levels, the first level being greater than the power during an information-reproducing operation, the second level being smaller than the power during the information-erasing operation.

20. An optical information recording and/or erasing system as set forth in claim 16, wherein the servo error signal represents a focusing error caused by a difference between a focal point of the lens of said optical system and a recording surface of the information-recording medium, said servo control means moving the lens of said optical system to compensate for the focusing error.

21. An optical information recording and/or erasing system as set forth in claim 16, wherein the servo error signal represents a tracking error caused by a difference between a focal point of the lens of said optical system and a center line of a recording track defined on a recording surface of the information-recording medium, said servo control means moving the lens of said optical system to compensate for the tracking error.

22. An optical information recording and/or erasing system comprising:
   a light source;
   an optical system including a lens which is arranged to converge light beams emerging from said light source to form an optical spot on an information-recording medium, the information recording medium including an information-recording portion on which information data are recorded and an address portion on which addresses are recorded, the information recording portion having a recording density of 3 bits per square $\mu$m, the recording density of the address portion being lower than that of the information-recording portion;
   a photodetector responsive to light reflected from the information-recording medium to provide a servo error signal indicative of misalignment of a focal point of the lens of said optical system on the information-recording medium;
   servo control means, responsive to a servo control signal, for moving the lens of said optical system to compensate for the misalignment of the focal point of the lens;
   an offset signal circuit adding an offset signal to compensate for a variation in the servo control signal due to a variation in wavelength of the light beams provided from said light source; and
   a control circuit responsive to the servo error signal from said photodetector to provide the servo control signal to said servo control means, said control circuit inhibiting an information-recording or erasing operation for a preselected period of time following addition of the offset signal to the servo control signal, said information-recording or erasing operation going forward after the expiration of the period of time and detection by said control circuit of a desired address on said information-recording medium for said operation.

* * * * *